United States Patent [19]

Ogata et al.

[11] Patent Number: 4,477,850
[45] Date of Patent: Oct. 16, 1984

[54] ADAPTER FOR A MINIATURE TYPE TAPE CASSETTE

[75] Inventors: Haruki Ogata, Sagamihara; Kimio Ogawa; Hiroyuki Umeda, both of Yokohama, all of Japan

[73] Assignee: Victor Company of Japan, Ltd., Yokohama, Japan

[21] Appl. No.: 340,105

[22] Filed: Jan. 18, 1982

[30] Foreign Application Priority Data

Jan. 20, 1981 [JP] Japan ................................. 56-7566

[51] Int. Cl.$^3$ ........................................... G11B 15/66
[52] U.S. Cl. .................................................. 360/94
[58] Field of Search ............... 360/85, 94, 96.5, 96.6, 360/132

[56] References Cited

U.S. PATENT DOCUMENTS

| 3,740,495 | 6/1973 | Kihara | 360/85 |
| 3,964,099 | 6/1976 | Sato | 360/94 |
| 4,169,277 | 9/1979 | Tomoser | 360/94 |

FOREIGN PATENT DOCUMENTS

| 2242808 | 3/1974 | Fed. Rep. of Germany. |
| 2658586 | 7/1977 | Fed. Rep. of Germany. |
| 2206555 | 6/1974 | France. |
| 2335908 | 7/1977 | France. |
| 1312282 | 4/1973 | United Kingdom. |

Primary Examiner—Robert S. Tupper
Attorney, Agent, or Firm—Louis Bernat

[57] ABSTRACT

An adapter for a miniature type tape cassette has an external form and size smaller than those of a standard type tape cassette, which is designed for a recording and/or reproducing apparatus of a type different from a standard type recording and/or reproducing apparatus cooperating with the standard type tape cassette. The adapter comprises an adapter case having an external form and size substantially equal to those of the standard type tape cassette, an accommodating part for accommodating the miniature type tape cassette, and a tape draw-out mechanism provided within the adapter case, for drawing a tape out of the miniature type tape cassette so as to form a predetermined tape path within the adapter case.

12 Claims, 15 Drawing Figures

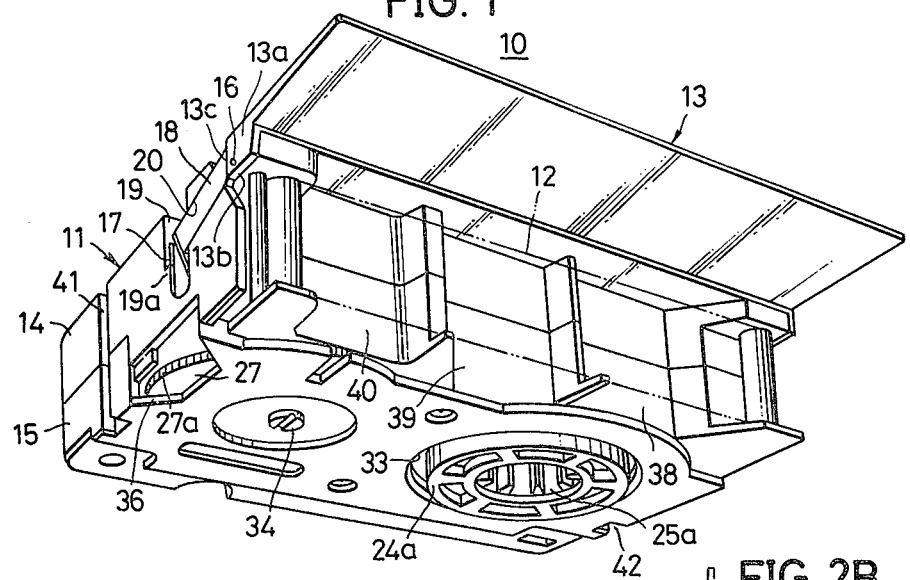
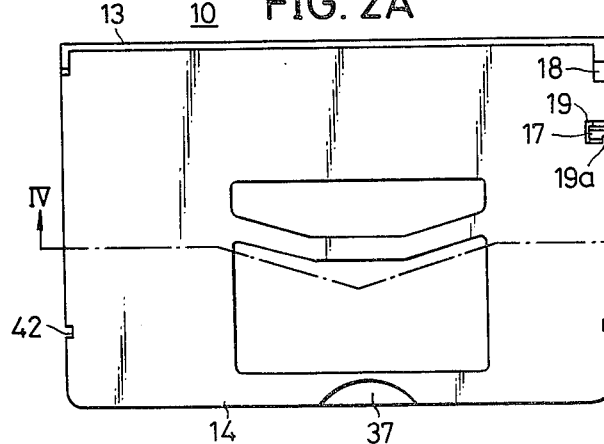
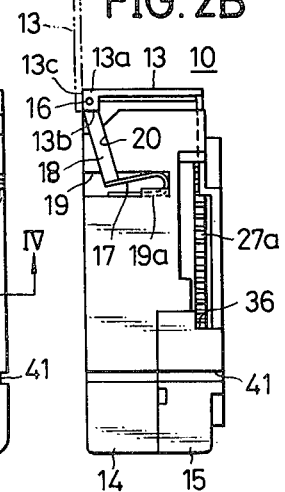
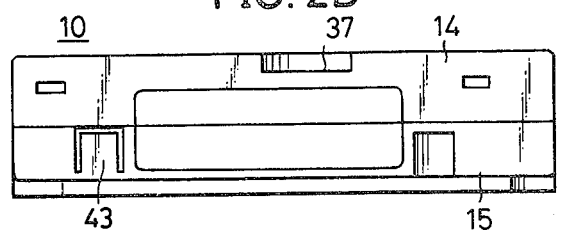

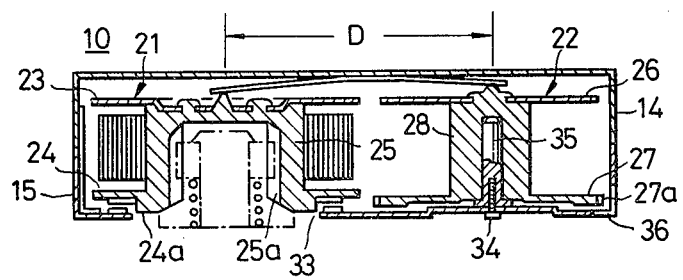
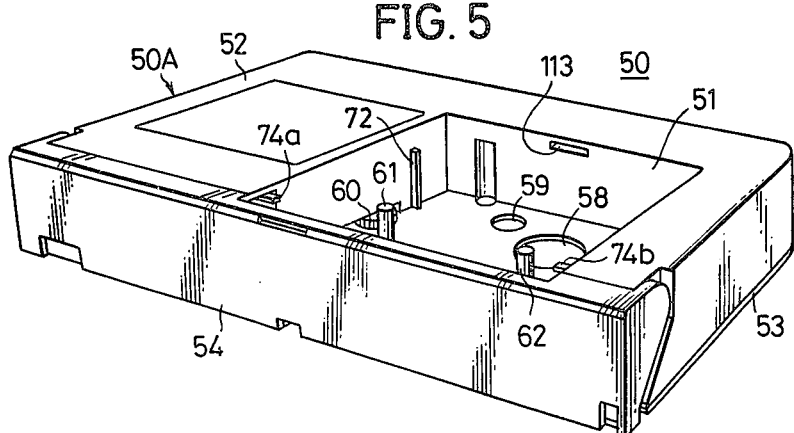
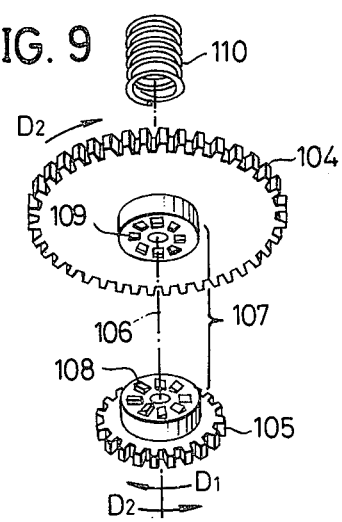

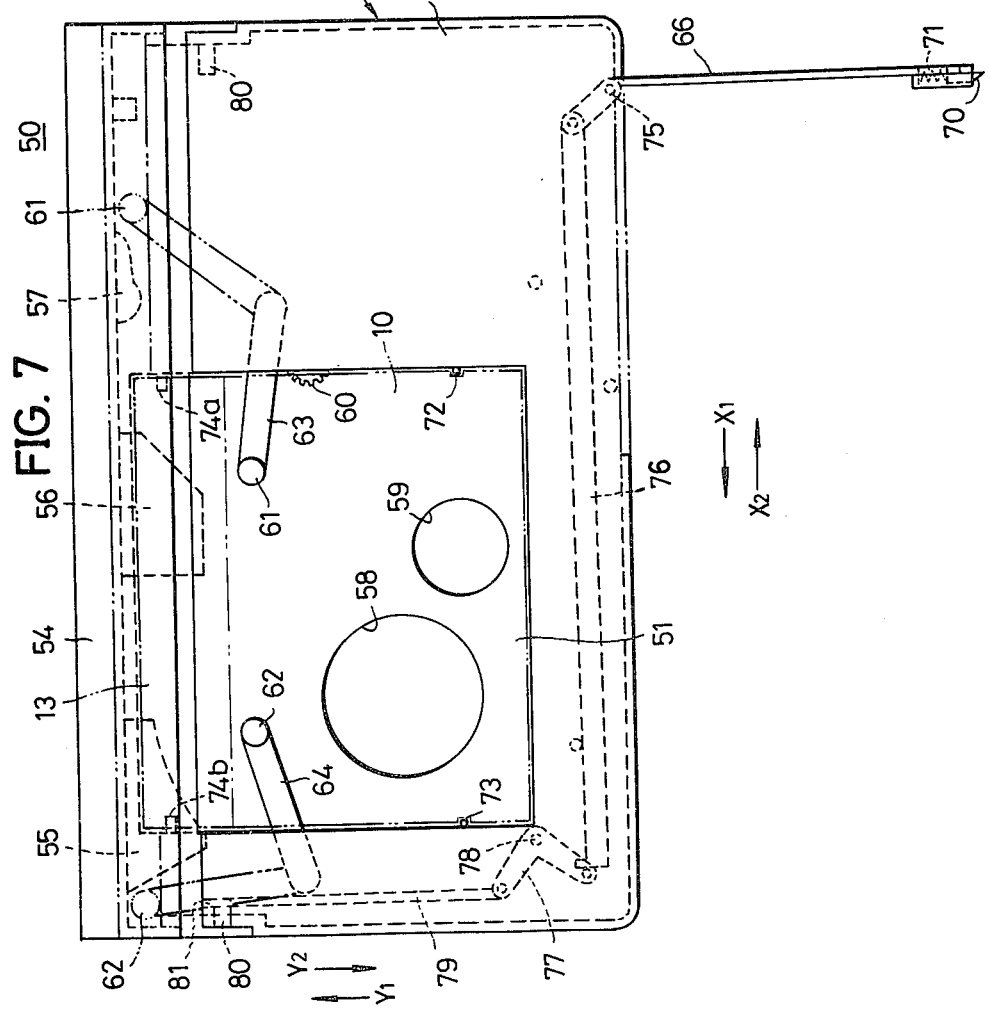

ADAPTER FOR A MINIATURE TYPE TAPE CASSETTE

BACKGROUND OF THE INVENTION

The present invention generally relates to adapters for miniature type tape cassettes, and more particularly to an adapter having an external form and size equal to those of a standard type tape cassette used with a standard type recording and/or reproducing apparatus. The adapter is loaded into the standard type recording and/or reproducing apparatus in a state accommodating a miniature type tape cassette which is smaller than the standard type tape cassette. Within the adapter predetermined tape path is formed by drawing a tape out of a cassette case. The miniature type tape cassette is loaded independently into a recording and/or reproducing apparatus of a type different from the standard type recording and/or reproducing apparatus.

Presently, video signal recording and/or reproducing apparatuses using tape cassettes are reduced to practical use on the world-wide basis. As types of these recording and/or reproducing apparatuses using tape cassettes, two or three standardized types of apparatuses presently exist world-widely. There is no interchangeability between apparatuses of different standards, however, the interchangeability exists between apparatuses adopting the same standard. Accordingly, a tape cassette recorded by one recording and/or reproducing apparatus can be reproduced by another recording and/or reproducing apparatus of the same standard. Hence, in order to ensure the interchangeability between different recording and/or reproducing apparatuses manufactured by different manufacturers so as to perform recording and/or reproduction, a standardization is established with respect to formats of the tape cassette and the recording and/or reproducing apparatus. That is, the above formats are standardized for each standard, and a standard type tape cassette and a standard type recording and/or reproducing apparatus are respectively manufactured and marketed under each standard Recently, a problem of much importance involves the realization in reducing the size of the recording and/or reproducing apparatus main body. This is to develop a more compact portable type recording and/or reproducing apparatus, and, for example, to realize such an equipment that a recording apparatus is unitarily built into a television camera.

In this regard, some attempts have been made to develop a compact type recording and/or reproducing apparatus using a compact or miniature type tape cassette, which uses a tape pattern and format completely different from those of the standard type recording and/or reproducing apparatus using the standard type tape cassette which are already and widely accepted in the market. However, such compact type recording and/or reproducing apparatus attempted for realization uses a format completely different from that of the standard type recording and/or reproducing apparatus, and the interchangeability does not exist therebetween. Therefore, in this compact type recording and/or reproducing apparatus, there is a disadvantage in that a tape cassette recorded by the compact type recording and/or reproducing apparatus cannot be reproduced by the standard type recording and/or reproducing apparatus. This is a great inconvenience and disadvantage to the owners of the compact type recording and/or reproducing apparatus.

Another attempt has also been made to realize a compact type portable recording and/or reproducing apparatus which performs recording and/or reproduction with the same tape pattern and format as the standard type recording and/or reproducing apparatus, by using a tape cassette whose size is slightly reduced by reducing the tape quantity and the diameter of the reels from those of the standard type tape cassette. In this system, a tape cassette recorded by the portable recording and/or reproducing apparatus can be reproduced as it is by the standard type recording and/or reproducing apparatus.

However, in the tape cassette used in the above portable recording and/or reproducing apparatus, the distance between a supply side reel and a take-up side reel is kept equal to the distance between the supply side and take-up side reels of the standard type tape cassette, so that the tape cassette used for the portable recording and/or reproducing apparatus can be loaded into the standard type recording and/or reproducing apparatus. Hence, even when the tape quantity is reduced in order to reduce the diameter of the reels, there is a limit in reducing the diameter of these reels. Therefore, in this system, there was a disadvantage in that the size of the tape cassette as a whole could not be reduced significantly, and the same is true to the recording and/or reproducing apparatus.

Furthermore, another system is conceivable in which the tape quantity is reduced to reduce the diameter of the reels, and further, the miniature type tape cassette is constructed by reducing the distance between the supply side and take-up side reels. In this system, as a modification of the standard type recording and/or reproducing apparatus, the recording and/or reproducing apparatus can be constructed so that a reel disc for driving the take-up side reel is movable. In this modification of the standard type recording and/or reproducing apparatus, the take-up side reel disc is at a normal position when loaded with the standard type tape cassette, and the take-up side reel disc is moved to a position closer to the supply side reel disc when loaded with the miniature type tape cassette However, even in this system, for example, there is a disadvantage in that the miniature type tape cassette recorded by the compact type recording and/or reproducing apparatus cannot be reproduced by the standard type recording and/or reproducing apparatus which is presently in wide use. Moreover, there is a disadvantage in that it is extremely difficult to realize a mechanism for moving the reel disc in the manner described above. Furthermore, the recording and/or reproducing apparatus using the tape cassette generally has a mechanism for drawing out the tape from inside the tape cassette to load the tape onto a predetermined tape path within the recording and/or reproducing apparatus. Therefore, it is also exceedingly difficult to construct the above mechanism for pulling out the tape, so that interchangeability exists with respect to the above compact or miniature type tape cassette and the standard type tape cassette. Practically, the realization of such a mechanism is virtually impossible.

SUMMARY OF THE INVENTION

Accordingly, it is a general object of the present invention to provide a novel and useful adapter for a miniature type tape cassette which enables the miniature type tape cassette to be loaded into a standard type recording and/or reproducing apparatus, and in which the above described disadvantages have been overcome.

Another and more specific object of the present invention is to provide an adapter having an external form and size equal to those of a standard type tape cassette designed for a standard type recording and/or reproducing apparatus. The adapter is loaded into the standard type recording and/or reproducing apparatus in a state accommodating a miniature type tape cassette which is smaller than the standard type tape cassette. Within the adapter a predetermined tape path is formed by drawing a tape out of a cassette case. The miniature type tape cassette is loaded independently into a recording and/or reproducing apparatus of a type different from the standard type recording and/or reproducing apparatus. The adapter according to the present invention has a mechanism for drawing out the tape, so that by manipulating a manipuating part, the tape is intercepted and drawn out from the cassette case of the miniature type tape cassette to form the predetermined tape path within the adapter.

Still another object of the present invention is to provide an adapter for a miniature type tape cassette constructed in such a way that by manipulating in another manner the manipulating part of the above mechanism for drawing out the tape, the mechanism draws the tape which has been drawn out within the adapter into the cassette case.

Other objects and further features of the present invention will be apparent from the following detailed description when read in conjunction with the accompanying drawings.

BRIEF DESCRIPTION OF THE DRAWINGS

FIG. 1 is a perspective view showing an example of a miniature type tape cassette which is accommodated within an adapter for a miniature type tape cassette according to the present invention, in a state where a tape protecting lid is open, viewed from a lower direction with respect to the front of the miniature type tape cassette;

FIGS. 2A, 2B, 2C, and 2D respectively show a plan view, a side view, a bottom view, and a rear view of the miniature type tape cassette shown in FIG. 1;

FIG. 4 shows a cross section taken along a line IV—IV in FIG. 2A;

FIG. 5 is a perspective view showing an embodiment of an adapter for a miniature type tape cassette according to the present invention;

FIG. 7 is a plan view showing the adapter shown in FIG. 5 together with a lid opening and closing mechanism, in a state where a cover at the rear of the adapter is open;

FIG. 8 is a side view showing the adapter shown in FIG. 7;

FIG. 9 is a perspective view showing an uni-directional clutch within the mechanism shown in FIG. 6;

DETAILED DESCRIPTION

Figure 2C:
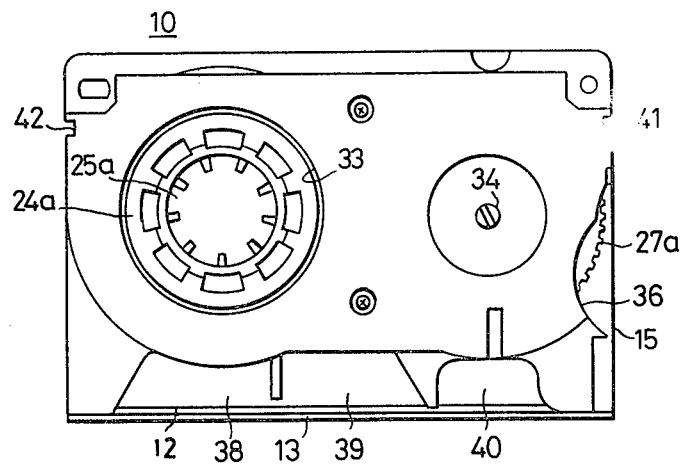

First, description will be given with respect to a miniature type tape cassette which can be applied to an adapter for a miniature type tape cassette according to the present invention.

A miniature type tape cassette 10 is shown in FIGS. 1, 2A through 2D, 3, and 4. The tape cassette 10 has a cassette case 11 of a size smaller than a standard type tape cassette which is primarily designed for a standard type recording and/or reproducing apparatus. A lid 13 for protecting a magnetic tape 12 accommodated within the tape cassette 10, is provided on the front of the cassette case 11. The cassette case 11 consists of an upper half 14 and a lower half 15.

A part of a rectangular-shaped side flange part 13a of the lid 13 is axially supported by a hinge pin 16 at a part in the vicinity of a corner part of the upper half 14, so that the lid 13 is rotatable to open and close. A substantially U-shaped leaf spring 17 and a slide rod 18 which is urged in the direction of the hinge pin 16 by the leaf spring 17, are provided in relation to the above lid 13. The lid 13 can assume two states. That is, in one state, one side edge 13b of the flange part 13a is pushed by the slide rod 18, and the lid 13 is in a closed state shown in FIG. 2B. Further, in another state, another side edge 13c of the flange part 13a is pushed by the slide rod 18, and the lid 13 is an open state shown in FIG. 1 and as indicated by a two-dot chain line in FIG. 2B. The U-shaped leaf spring 17 is fitted into a side groove 19 of the upper half 14, in a state where the leaf spring 17 is held by a projecting rib 19a and does not easily separate from the side groove 19. The slide rod 18 is provided within a groove 20 at the side of the upper half 14, in a freely slidable manner. Moreover, when the tape cassette 10 is not loaded into a recording and/or reproducing apparatus exclusively for the tape cassette 10 or accommodated within a tape cassette adapter (description with respect to the recording and/or reproducing apparatus designed exclusively for the tape cassette 10 and the tape cassette adapter will be given afterwards), the lid 13 covers the front of the cassette case 11 to protect the magnetic tape 12 which is exposed at the front surface of the cassette case 11.

Figure 3:
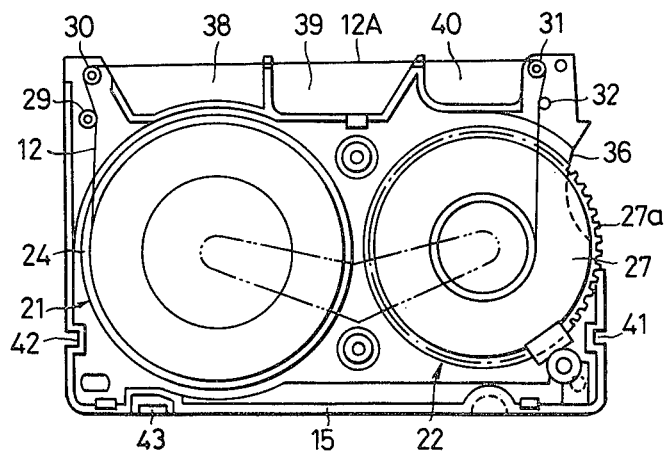
FIG. 3 is a plan view showing the inner construction of the miniature type tape cassette shown in FIG. 1 in a state where an upper half of a cassette case and an upper flange of a reel are removed.

In addition, as shown in FIGS. 3 and 4, a supply side reel (supply reel) 21 and a take-up side reel (take-up reel) 22 are provided side by side within the cassette case 11. A distance D between centers of the reels 21 and 22 is shorter than the distance between centers of supply and take-up reels of a standard type tape cassette designed for a standard type recording and/or reproducing apparatus. With respect to the supply reel 21, the magnetic tape 12 is wound around a reel hub 25 between upper and lower flanges 23 and 24. Similarly, the magnetic tape 12 is wound around a reel hub 28 between upper and lower flanges 26 and 27, with respect to the take-up reel 22. The magnetic tape 12 is unwound from the supply reel 21 and guided by guide poles 29, 30, 31, and 32 provided at left and right end sides, along the front side of the cassette case 11, to form a tape path 12A reaching the take-up reel 22.

The supply reel 21 is provided in a state where an annular projecting step portion 24a of the lower flange 24 is loosely fitted into a hole 33 having a large diameter on the lower half 15.

The take-up reel 22 is provided in a rotatable manner such that a fixed shaft 35 fixed to the lower half 15 by a screw 34 is inserted into a center hole of the reel hub 28.

In addition, gear teeth 27a are formed on the entire peripheral part of the lower flange 27 of the take-up reel 22. As shown in FIGS. 1, 2B, 2C, 3, and 4, a part of the peripheral part of the lower flange 27 is exposed through a cutout window 36 formed at a part between the side surface and the bottom surface of the lower half 15.

In addition, a substantially semi-circular depressed step part 37 in the plan view, is formed at a central top part in the upper surface of the tape cassette 10 extending to the rear side. This depressed step part 37 engages with an engaging lever provided on the tape cassette adapter, as will be described hereinafter.

Figure 2E:
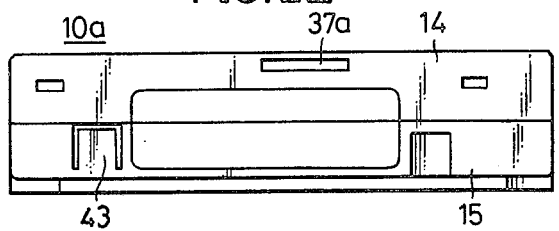
FIG. 2E is a rear view showing a modification of the miniature type tape cassette shown in FIG. 1.

FIG. 2E shows a miniature type tape cassette 10a which is a modification of the above described miniature type tape cassette. The tape cassette 10a has a depression 37a on the rear side at a position near the upper surface thereof, instead of the depressed step part 37. This depression 37a is of a substantially semi-circular shape in the direction of the cassette width, similarly as in the case of the above depressed step part 37, and engages with the engaging lever provided on the tape cassette adapter. The above miniature type tape cassette 10a does not have any step at the upper surface thereof, since the depression 37a is used instead of the depressed step part 37.

The above miniature type tape cassette 10 (10a) has cutouts 38, 39, and 40 at the front side thereof, and grooves 41 and 42 at the right and left side walls thereof. Further, an erroneous erasure preventing tab 43 is provided at the rear side of the tape cassette 10 (10a).

Next, description will be given for a case where an adapter for a miniature type tape cassette according to the present invention is loaded into the standard type recording and/or reproducing apparatus in a state accommodating the tape cassette 10 having the above described construction, by referring to FIGS. 5 through 10.

An adapter 50 has an accommodating part 51 for accommodating the above tape cassette 10 within an adapter case 50A as shown in FIG. 5, and the adapter case 50A has an external form and size substantially equal to those of the standard type tape cassette. The adapter case 50A consists of a case body 52 having a top plate part and side wall parts, a bottom plate 53, and a lid 54. The lid 54 is free to open and close, and is provided at the front of the adapter case 50A. As will be described hereinafter, the lid 54 protects the magnetic tape which forms a predetermined tape path within the adapter 50.

Figure 6:
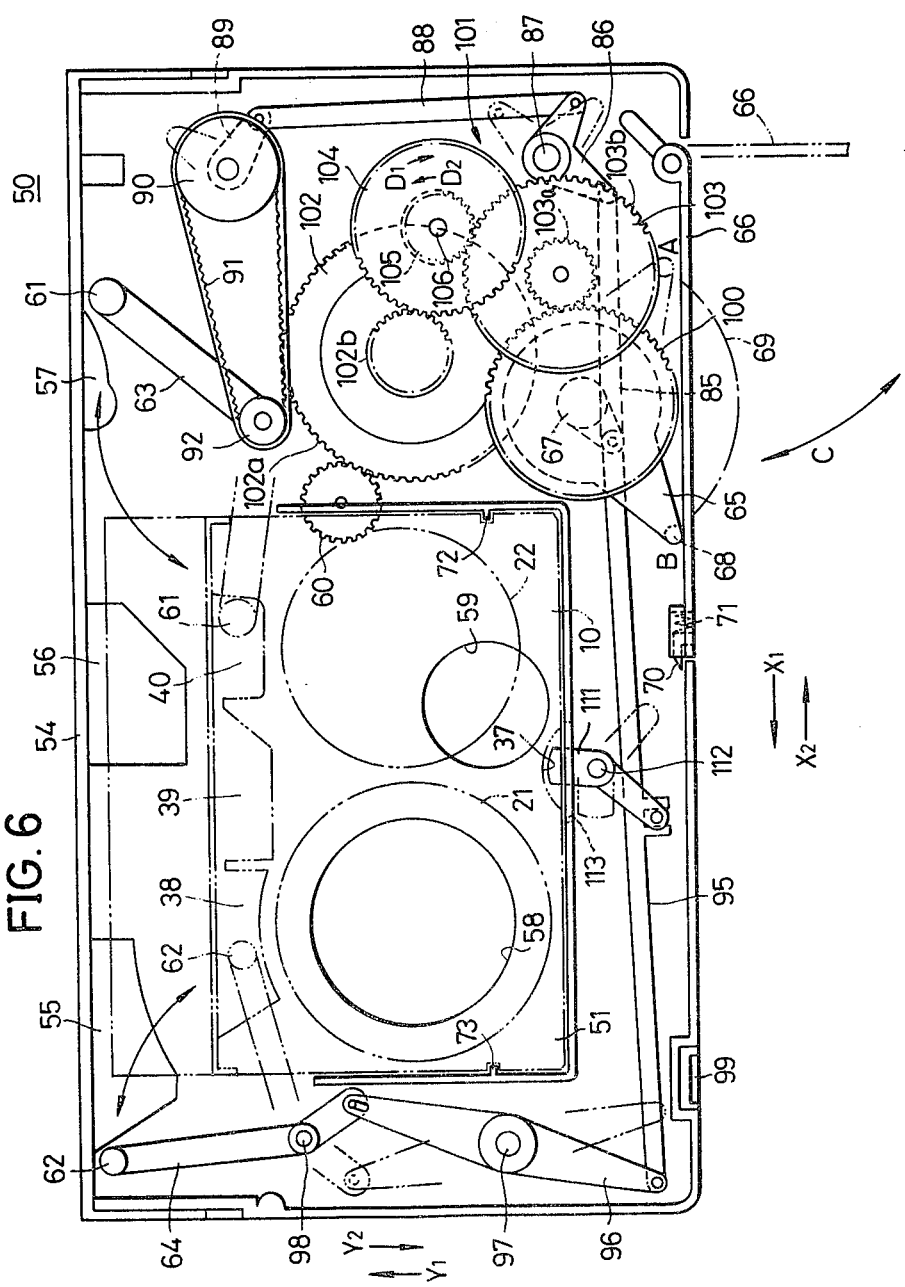
FIG. 6 is a plan view showing a mechanism for drawing out a tape within the adapter shown in FIG. 5 in a state where a top plate of the adapter is removed.

A mechanism for drawing out the tape and a rotation transmitting mechanism for taking-up the tape, respectively shown in FIG. 6, and a mechanism for opening and closing the lid, shown in FIG. 7, are provided within the above adapter case 50A. Cutouts 55 and 56 into which loading poles enter, and a cutout 57 into which a capstan enters, are respectively provided at the front side of the bottom plate 53.

The accommodating part 51 is formed as a depression having an opening at the upper part thereof. A reel driving shaft inserting hole 58 and a cassette push-out hole 59 are provided on the bottom part of the accommodating part 51. Furthermore, a reel driving gear 60 partly projects into the accommodating part 51 from a side of the accommodating part 51.

Poles (or rollers) 61 and 62 for drawing out and guiding the tape are respectively embedded at the ends of a first loading arm 63 and a second loading arm 64. These poles 61 and 62 move between positions indicated by two-dot chain lines in FIG. 6 (solid lines in FIG. 7) before the tape is drawn out, and positions indicated by solid lines in FIG. 6 (two-dot chain lines in FIG. 7) after the operation of tape drawing out is completed. Before the tape is pulled out, the poles 61 and 62 are positioned within the accommodating part 51, and are at positions opposing the cutouts 40 and 38 of the tape cassette which is accommodated within the adapter 50. After the operation of drawing out of the tape is completed, the poles 61 and 62 respectively are at positions corresponding to positions of right and left tape guide poles provided at the front of the standard type tape cassette, to guide the tape. The poles 61 and 62 simultaneously move between the above two positions, by rotationally manipulating a manipulation lever 65 provided at the rear of the adapter case 50A between a non-operational position A and an operation completed position B.

A hinged cover 66 is provided at the rear of the adapter case 50A, so that the cover 66 is free to open and close along an arrow C. As will be described hereinafter, the lid 54 is opened and closed in response to the opening and closing of the above cover 66. The cover 66 is provided at a position opposing to the manipulation lever 65. As shown in FIG. 6, the cover 66 covers the lever 65 in a closed state so that the lever 65 cannot be manipulated. On the other hand, when the cover 66 is open, the lever 65 can be manipulated from outside the adapter case 50A. Accordingly, the lever 65 can only be manipulated when the cover 66 is open. Moreover, the lever 65 is rotated about a shaft 67. Thus, a rotary free end 68 of the lever 65 projects outside the adapter case 50A beyond the position of the cover 66 which is assumed to be closed, and then enters again within the adapter case 50A. The rotary free end 68 accordingly moves along a locus 69 indicated by a one-dot chain line in FIG. 6. Therefore, when the lever 65 is at an intermediate position between the positions A and B, the cover 66 cannot be closed since the rotary free end 68 of the lever 65 interferes with the closing of the cover 66. That is, the cover 66 can only be closed when the lever 65 is at either the position A or B.

A locking mechanism consisting of a finger 70 and a spring 71 is provided at the tip end of the cover 66, to lock the cover 66 in the closed state as shown in FIG. 6. The rotary free end 68 of the lever 65 makes contact with the rear surface of the cover 66, to lock the lever 65 at either the above position A or B.

Next, description will be given with respect to the operation in which the tape cassette 10 is accommodated within the accommodating part 51 of the above adapter 50, to form a predetermined tape path within the adapter 50.

When the tape cassette 10 is accommodated into the adapter 50, the lever 65 is at the non-operational position A and the cover 66 is in the closed state. Hence, the poles 61 and 62 are positioned within the accommodating part 51, and the lid 54 is closed. Since the lever 65 makes contact with the cover 66 and is restricted from rotating at the position A, the poles 61 and 62 are respectively and stably maintained at predetermined positions without unnecessarily moving within the accommodating part, 51. The same is true even when the empty adapter 50 is handled roughly.

The tape cassette 10 is accommodated within the accommodating part 51, in a state where the lid 13 is open and the magnetic tape 12 is not drawn out, by pushing down the tape cassette 10 into the adapter 50. The tape cassette 10 is accommodated facing a predetermined direction, by fitting the grooves 41 and 42 provided on the side of the tape cassette over corresponding projecting ribs 72 and 73 provided at the accommodating part 51. By the above operation to accommodate the tape cassette 10 within the adapter 50, the poles 61 and 62 are respectively and relatively inserted into the cutouts 40 and 38 of the tape cassette 10 on the inner side of the tape path 12A, so as to oppose the tape path 12A. Moreover, the gear teeth 27a meshes with the gear 60. Right and left engaging arms 74a and 74b engage with the lid 13, to positively maintain the lid 13 in the open state.

In the above state, the cover 66 of the adapter case 50A is opened, the lever 65 is rotationally manipulated to the position B, and the cover 66 is closed. By these series of operations, the magnetic tape 12 is drawn out of the tape cassette 10, to form a predetermined tape path within the adapter case 50A.

In detail, as shown in FIGS. 7 and 8, when the cover 66 is rotated counterclockwise about a shaft 75 by an angle of approximately ninety degrees, a lever 76 slides in the direction of an arrow X1. Moreover, an L-shaped lever 77 rotates clockwise about a pin 78 to push a lever 79 in the direction of an arrow Y1. The tip end of the lever 79 is linked to an arm 81 which is fixed to a shaft 80 of the opening and closing lid 54. By the above described movement of the lever 79, the lid 54 opens halfway as shown especially in FIG. 8.

In the above state, the lever 65 is rotated clockwise to the position B indicated by a solid line in FIG. 6, from the position A indicated by a two-dot chain line in FIG. 6. By this clockwise rotation of the lever 65, a connector 85 moves in the direction of the arrow X1. Thus, an L-shaped rotary lever 86 rotates clockwise about a shaft 87, a connector 88 moves in the direction of an arrow Y2, and a lever 89 rotates clockwise. A timing gear 90 rotates unitarily with the lever 89. By the above rotation of the gear 90, a timing gear 92 is rotated clockwise with a timing belt 91, and a first loading arm 63 rotates unitarily with the gear 92 clockwise, to a position indicated by a solid line in FIG. 6. Further, by the above operation of the lever 65, a connector 95 moves in the direction of the arrow X1, a rotary lever 96 rotates about a shaft 97 clockwise. When the above rotary lever 96 rotates, the second loading arm 64 rotates counterclockwise about a shaft 98 to a position indicated by the solid line in FIG. 6

By the rotation of the above first and second loading arms 63 and 64, the poles 63 and 64 intercept and engage with the magnetic tape 12 to draw the magnetic tape 12 out of the tape cassette 10. These poles 63 and 64 reach positions indicated by solid lines in FIG. 6 whereat the operation of drawing out of the magnetic tape is completed. When the lid 54 is in the closed state, the poles 61 and 62 will hit the lid 54 as these poles 61 and 62 move. However, in the present embodiment of the invention, the lid 54 is open as shown in FIG. 8 when these poles 61 and 62 move. Accordingly, these poles 61 and 62 can move to the positions whereat the operation of drawing out of the magnetic tape is completed, without hitting the lid 54. The magnetic tape 12 is drawn out from the reels 21 and 22 of the tape cassette 10, to form a predetermined tape path 12B, guided by the poles 61 and 62. The positions of the poles 61 and 62 whereat the operation of drawing out of the magnetic tape is completed, correspond to positions of right and left guide poles provided at the front surface side of the standard type tape cassette. In addition, the tape path 12B which is formed by the guidance provided by the poles 61 and 62 becomes identical to the tape path formed at the front of the standard type tape cassette. When the adapter 50 is used, the poles 61 and 62 act as guides to guide the magnetic tape 12.

The cover 66 is rotated clockwise, to close as shown in FIG. 6. In relation with the closing operation of the cover 66, the lever 76 moves in the direction of an arrow X2 to go away from the lever 77. Accordingly, the lever 79 moves in the direction of an arrow Y2 due to the action of a spring (not shown), to close the lid 54. The cover 66 is locked at the closed state. When the adapter 50 is used, a force due to the tape tension acts on the poles 61 and 62, so as to return the poles 61 and 62 to the original positions. However, at the position B, the rotary free end 68 of the manipulation lever 65 is pushed by the rear surface of the cover 66 which is locked in the closed state. Hence, the lever 65 is limited of rotation in the counterclockwise direction, and the poles 61 and 62 are stably maintained at the positions whereat the operation to draw out of the magnetic tape is completed.

Therefore, the forming of the tape path 12B within the adapter case 50A is performed without touching the magnetic tape by the operator's hand, and is convenient in view of protecting the magnetic tape.

When the tape cassette 10 is to be extracted from the adapter 50, the cover 66 is opened, the lever 65 is rotated counterclockwise to return to the original position A and then, the cover 66 is closed.

By the operation of the manipulation lever 65 in particular, the loading arms 63 and 64 respectively rotate counterclockwise and clockwise. Moreover, the poles 61 and 62 return into the cutouts 40 and 38 of the tape cassette 10 which is accommodated within the accommodating part 51.

In addition, by the above operation of the lever 65, the rotation of a gear 100 which is unitarily provided with the lever 65, is transmitted to a gear structure 102 through a gear mechanism 101. Further, the above rotation is transmitted to the take-up reel 22 within the tape cassette 10, through the gear 60 which meshes with a gear part 102a of the gear structure 102. Accordingly, the take-up reel 22 is rotated clockwise, to take-up the magnetic tape 12 which was drawn outside the tape cassette 10. The take-up reel 22 is rotated by an amount so as to sufficiently take-up the length of the magnetic tape 12 drawn outside the tape cassette 10.

Hence, by the operation of the lever 65, the entire magnetic tape 12 drawn outside the tape cassette 10 is retracted into the tape cassette 10. Accordingly, it is not necessary to perform an additional manipulation to take-up the magnetic tape after the lever 65 is manipulated, and the tape cassette 10 can immediately be extracted from the accommodating part 51. The tape cassette 10 can be extracted from the accommodating part 51 by inserting the operator's finger tip into the hole 59 and pushing the bottom surface of the tape cassette 10 upwards.

The gear mechanism 101 consists of a gear structure 103, a large-diameter gear 104, and a small-diameter gear 105. The above gear structure 103 has a small-diameter gear part 103a which meshes with the gear 100, and a large-diameter gear part 103b which meshes with the small-diameter gear 105. The large-diameter gear 104 meshes with a vertex gear part 102b of the gear structure 102, and is coaxially provided with the small-diameter gear 105 in a state axially supported by a shaft 106. As shown in FIG. 9, a uni-directional clutch 107 is provided between the large-diameter gear 104 and the small-diameter gear 105. The uni-directional clutch 107 has a construction of such that a series of saw-tooth shaped gear parts 108 arranged on the upper part of the small-diameter gear 105 which are designed to engage with a series of depressions 109 arranged in the peripheral direction at the bottom part of the large-diameter gear 104, in a state where the large-diameter gear 104 is pushed against the small-diameter gear 105 by the action of a coil spring 110.

In a case where the lever 65 is rotated in the clockwise direction so as to form the tape path 12B, the small-diameter gear 105 rotates in the direction of an arrow D1 to disengage the saw-tooth gear parts 108 and the depressions 109 causing the directional clutch 107 to slips. Moreover, the large-diameter gear 104 does not rotate due to a load applied thereto, and the take-up reel 22 accordingly is not rotated. Hence, the magnetic tape 12 is drawn out without introducing slack in the magnetic tape, and forms the tape path 12B under tension. On the other hand, when the manipulation lever 65 is rotated counterclockwise so as to remove the tape path 12B, the small-diameter gear 105 rotates in the direction of an arrow D2. Thus, this rotation of the small-diameter gear 105 is transmitted to the large-diameter gear 104 through the uni-directional clutch 107. Moreover, the above rotation is transmitted to the gear 60 through the gear structure 102 to rotate the gear 60 counterclockwise. Therefore, the take-up reel 22 is rotated towards the tape take-up direction (clockwise). In addition, when the adapter 50 is loaded into the standard recording and/or reproducing apparatus, the gear structure 102 is rotated in the clockwise direction. By this rotation of the gear structure 102, the large-diameter gear 104 is rotated in the direction of the arrow D2. Thus, the uni-directional clutch 107 slips so that the small-diameter gear 105 is not forced to rotate, and no mechanical discrepancies are introduced.

In the above adapter 50, the lever 65 is always manipulated in a state where the cover 66 is open, due to the construction of the adapter 50. The poles 61 and 62 hence move in a state where the lid 54 is open, so that the poles 61 and 62 can move between positions before the tape is drawn out and the positions after the operation of drawing out of the tape is completed, without hitting the lid 54. The cover 66 can only be fully closed when the lever 65 is at either the position A or B, and cannot be closed when the lever 65 is at a position halfway between these positions A and B. Therefore, no inconveniences are introduced since the lid 54 cannot be closed when the poles 61 and 62 are moving.

By the above rotational manipulation of the lever 65 in the clockwise direction after the tape cassette 10 is accommodated within the adapter 50, the connector 95 moves in the direction of the arrow X1, and a lever 111 rotates clockwise about a shaft 112. Hence, the lever 111 projects within the accommodating part 51 through a window 113, to engage with the depressed step part 37 provided on the upper surface of the tape cassette 10 and hold the tape cassette 10 within the accommodating part 51. Accordingly, the tape cassette 10 is prevented from being erroneously extracted from the accommodating part 51 in a state where the magnetic tape 12 is drawn out of the tape cassette 10. Moreover, in the case of the other tape cassette 10a, the lever 111 enters within the depression 37a, and the tape cassette 10a is similarly prevented from being extracted from the accommodating part 51 in the above state where the magnetic tape 12 is drawn out of the tape cassette 10a.

Furthermore, regardless of whether the tape cassette 10 (10a) is accommodated within the accommodating part 51, when an attempt is made to accommodate the tape cassette 10 (10a) within the accommodating part 51 of the tape cassette adapter 50 in a state where the poles 61 and 62 are erroneously positioned at the positions indicated by the solid lines in FIG. 6 by performing the operation to draw out the magnetic tape 12, the tape cassette 10 (10a) hits the lever 111. Therefore, the tape cassette 10 (10a) is arrested by the lever 111 and can not be accommodated within the accommodating part 51, and the tape cassette 10 (10a) is thus prevented from being erroneously inserted into the tape cassette adapter 50.

When an attempt is made to extract the tape cassette 10 (10a) from the accommodating part 51 in a state where the magnetic tape 12 is drawn out of the tape cassette 10 (10a), or when an attempt is made to accommodate the tape cassette 10 (10a) within the accommodating part 51 in a state where the poles 61 and 62 are at the positions for completing the operation to draw out the magnetic tape 12, the magnetic tape 12 may become severely damaged. However, in the present embodiment of the invention, the tape cassette 10 (10a) can only be extracted from or accommodated within the accommodating part 51 when the lever 111 is in a state receded from the tape cassette. That is, the above extracting and accommodating operation with respect to the tape cassette 10 (10a) can only be performed when the poles 61 and 62 are at the original positions, to prevent an accidental damage of the magnetic tape 12. Moreover, especially since the tape cassette 10 (10a) is provided with the depressed step part 37 (depression 37a), the lever 111 can hold the tape cassette 10 (10a) without projecting beyond the upper surface of the tape cassette 10 (10a). That is, the holding operation to prevent the tape cassette 10 (10a) from moving and being extracted, is performed within the range of the height of the tape cassette itself. Therefore, the above described construction is convenient for the present embodiment of the invention wherein the tape cassette 10 (10a) is quite close to that of the tape cassette adapter is to be accommodated within the tape cassette adapter which is restricted of the height.

As shown in FIG. 6, the above described tape cassette adapter 50 has an erroneous erasure preventing tab 99 which is removal, at a position corresponding to the position of the erroneous erasure preventing tab of the standard type tape cassette.

In addition, in the state where the tape cassette 10 is accommodated within the adapter 50, the supply reel 21 and the gear structure 102 respectively are at positions corresponding to the positions of the supply reel and the take-up reel of the standard type tape cassette.

Figure 10:
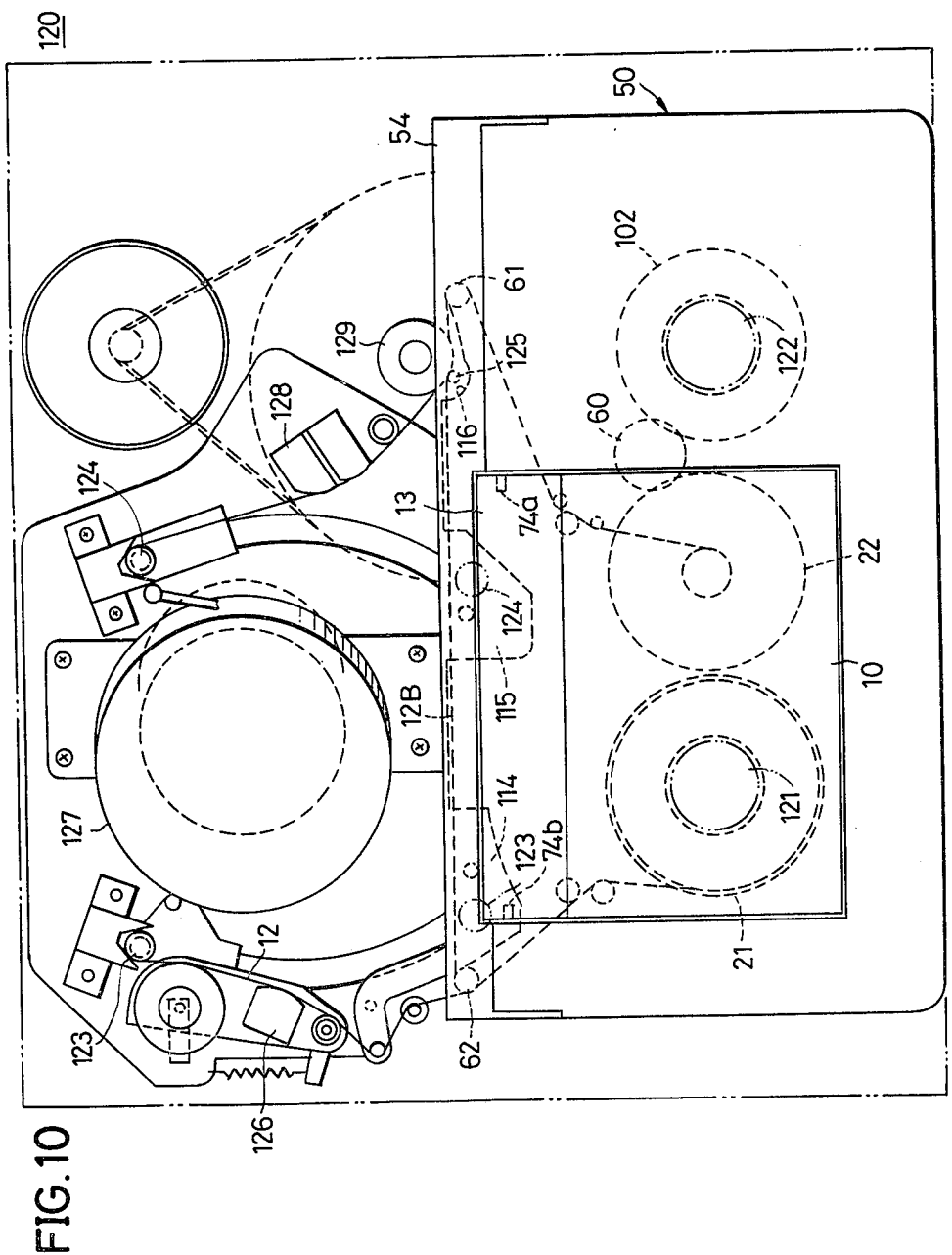
FIG. 10 is a plan view showing an example of a standard type recording and/or reproducing apparatus loaded with the adapter for a miniature type tape cassette shown in FIG. 5, in a state where the miniature type tape cassette shown in FIG. 1 is accommodated, and a predetermined tape path is formed within the adapter, during a recording or reproducing mode.

As shown in FIG. 10, the tape cassette adapter 50 accommodating the tape cassette 10 is loaded into a standard type recording and/or reproducing apparatus 120, similarly as in the case where the standard type tape cassette is loaded.

That is, by loading the tape cassette adapter 50, a supply reel driving shaft 121 is inserted into a reel driving shaft inserting part 25a of the supply reel 21 of the tape cassette 10. On the other hand a take-up reel driving shaft 122 is inserted into a reel driving shaft inserting part of the gear structure 102 within the tape cassette adapter 50. In addition, loading poles 123 and 124 and a capstan 125 respectively enter into the cutouts 114, 115, and 116.

Upon a tape loading operation, the above loading poles 123 and 124 respectively intercept and engage with the magnetic tape 12, then draw the magnetic tape 12 out of the cassette, and reach positions indicated by solid lines in FIG. 10. Accordingly, the magnetic tape 12 which is drawn outside the tape cassette adapter 50, makes contact with a full-width erasing head 126, and makes contact with a guide drum 127 provided with rotary video head over a predetermined angular range. The magnetic tape 12 further makes contact with an audio and control head 128. Therefore, the above magnetic tape 12 is loaded onto a predetermined tape travelling path. The magnetic tape 12 is driven in a state pinched between the capstan 125 and a pinch roller 129. Moreover, the gear structure 102 within the tape cassette adapter 50 is rotated clockwise by the take-up reel driving shaft 122. This rotation of the gear structure 102 is transmitted to the take-up reel 22 through the gear 60, to drive the magnetic tape 12 towards a tape take-up direction. Accordingly, the magnetic tape 12 fed out by the capstan 125 is taken-up by the take-up reel 22. The magnetic tape 12 is guided by the pole 62 at the exit part of the adapter 50, and guided by the pole 61 at the entrance part of the adapter 50. Since the poles 61 and 62 are respectively and stably maintained at predetermined positions, the tape travel at the exit part of the adapter 50 is stable to the same degree as in the case of the standard type tape cassette.

Figure 11:
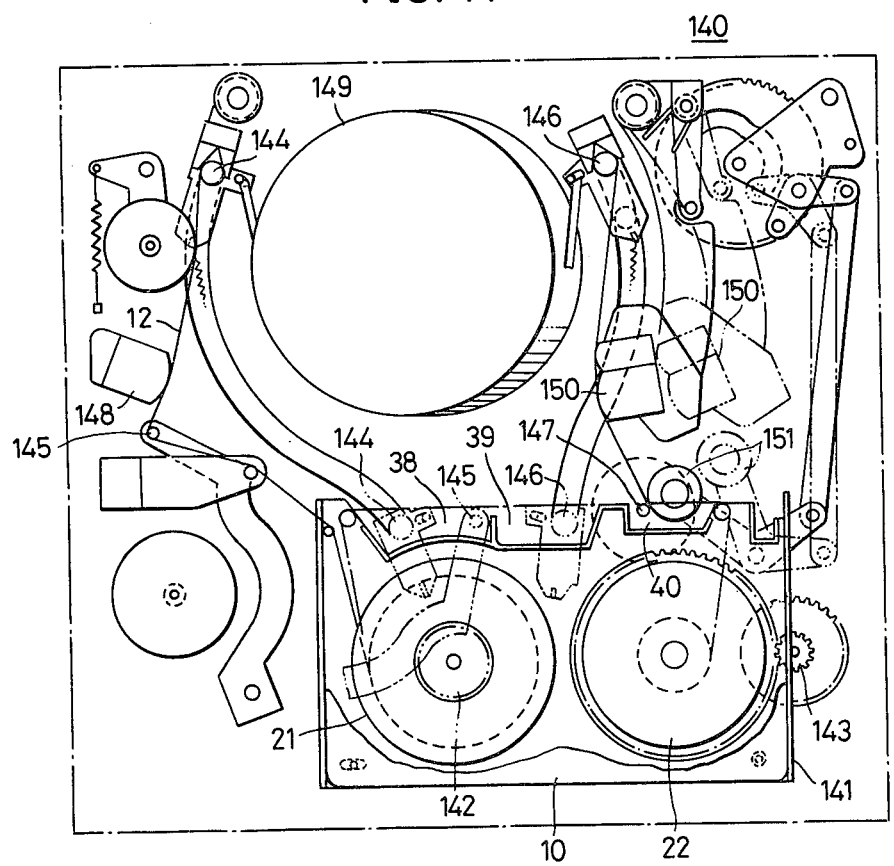
FIG. 11 is a plan view showing an example of a recording and/or reproducing apparatus exclusively for the miniature type tape cassette, which is loaded with the miniature type tape cassette shown in FIG. 1 during a recording or reproducing mode.

FIG. 11 shows a compact type recording and/or reproducing apparatus 140 exclusively designed for the miniature type tape cassette. The tape cassette 10 is inserted into a housing 141 and loaded into a loading part. In this state, the supply reel 21 fits over a supply reel driving shaft 142, and the take-up reel 22 meshes with a driving gear 143. In addition, the lid 13 opens, and a loading pole 144 and a pole 145 respectively and relatively enter into the cutout 38 of the tape cassette 10 while a capstan 147 relatively enters into the cutout 40 of the tape cassette 10.

When the operational mode of the recording and/or reproducing apparatus 140 is set to a play mode, the above poles 144, 145, and 146 intercept and engage with the magnetic tape 12 to draw out the magnetic tape 12, and respectively move to positions indicated by solid lines in FIG. 11. Hence, the magnetic tape 12 is drawn out of the tape cassette 10, to make contact with a full-width erasing head 148. The magnetic tape 12 further makes contact with a guide drum 149 provided with rotary video heads over a predetermined angular range, and also makes contact with an audio and control head 150. Thus, the magnetic tape 12 is loaded onto a predetermined tape travelling path. During recording and reproduction, the magnetic tape 12 is driven in a state pinched between the capstan 147 and a pinch roller 151. Moreover, the gear 143 which is rotated by a reel driving motor (not shown) meshes with the gear teeth 27a of the take-up reel 22, and the take-up reel 22 is accordingly driven towards a tape take-up direction. Accordingly, a signal is recorded onto and reproduced from the magentic tape 12 with a tape pattern and format identical to those of the standard type tape cassette cooperating with the standard type recording and/or reproducing apparatus.

Further, the present invention is not limited to these embodiments, but various variations and modifications may be made without departing from the scope of the present invention.

What is claimed is:

1. An adapter for a miniature type tape cassette having an external form and size smaller than those of a standard type tape cassette, said miniature type tape cassette being used with a recording and/or reproducing apparatus of a type different from a standard type recording and/or reproducing apparatus primarily designed for performing recording and/or reproduction with said standard type tape cassette, said adapter comprising:
   an adapter case having an external form and size substantially equal to those of said standard type tape cassette;
   an accommodating part for accommodating said miniature type tape cassette; and
   tape draw-out means provided within said adapter case, for drawing a tape out of said miniature type tape cassette so as to form a predetermined tape path within said adapter case.

2. An adapter as claimed in claim 1 in which said tape draw-out means comprises a pair of tape draw-out members which enter into said miniature type tape cassette within the inner side of the tape when said miniature type tape cassette is accommodated within said accommodating part, control means comprising a manipulation part, and means for moving said tape draw-out members responsive to a manipulation of said control means.

3. An adapter as claimed in claim 2 in which said tape draw-out members act as guiding members for guiding the tape, at positions whereat the operation of drawing-out of the tape is completed.

4. An adapter as claimed in claim 2 in which said means comprises a pair of rotary levers each of which has the tape draw-out member positioned at the tip end thereof, and means for transmitting the manipulation force of said control means as rotational forces to said rotary levers.

5. An adapter as claimed in claim 2 in which said adapter case has a cover at a position facing said manipulation part of said control means, and said cover covers said manipulation part of said control means when said cover is in a closed state so that the manipulation of said control means cannot be performed, and said cover exposes said manipulation part of said control means when said cover is in an opened position so that the manipulation of said control means can be performed from outside said adapter case.

6. An adapter as claimed in claim 5 in which said manipulation part of said control means comprises a rotary member having a rotary free end which moves along a locus with said cover open, said locus beginning from within said adapter case, exceeding beyond a position of closed cover, and entering again within said adapter case.

7. An adapter as claimed in claim 6 in which said cover is closed only upon a non-operational state and operation completed state of said manipulation part, and said manipulation part of said control means is prevented from rotating when said cover is in the closed state.

8. An adapter as claimed in claim 1 further comprising rotation transmitting means operating in relation to the operation of said tape draw-out means in a direction opposite to the tape-drawing-out direction, for transmitting a rotation to one reel of the miniature type tape cassette accommodated within said accommodating part in a direction so as to take-up the tape which has been drawn out of said miniature type tape cassette within the adapter case.

9. An adapter as claimed in claim 8 in which said rotation transmitting means has a uni-directional clutch for not transmitting rotation to said one reel upon a manipulation of said manipulation part of said control means when said manipulation is in a direction to draw out the tape, and for transmitting rotation to said one reel upon manipulation of said manipulation part in a direction which is opposite to the direction in which the tape is drawn out.

10. An adapter as claimed in claim 5 in which said adapter case further has a lid at the front surface of said adapter case, said lid being mounted in a manner which makes it free to open and to close to protect the tape in said predetermined tape path, and said adapter further comprises means for opening and closing said lid in response to the opening and closing of said cover respectively.

11. An adapter as claimed in claim 5 further comprising an engaging member provided in relation to said means for moving said tape draw-out members, for engaging a part of said miniature type tape cassette in response to an operation in which said tape draw-out members are moved in a direction to draw out the tape.

12. An adapter as claimed in claim 11 in which said miniature type tape cassette is provided with a depression, and said engaging member is a rotary lever for entering within said depression.

* * * * *